Figure 4:
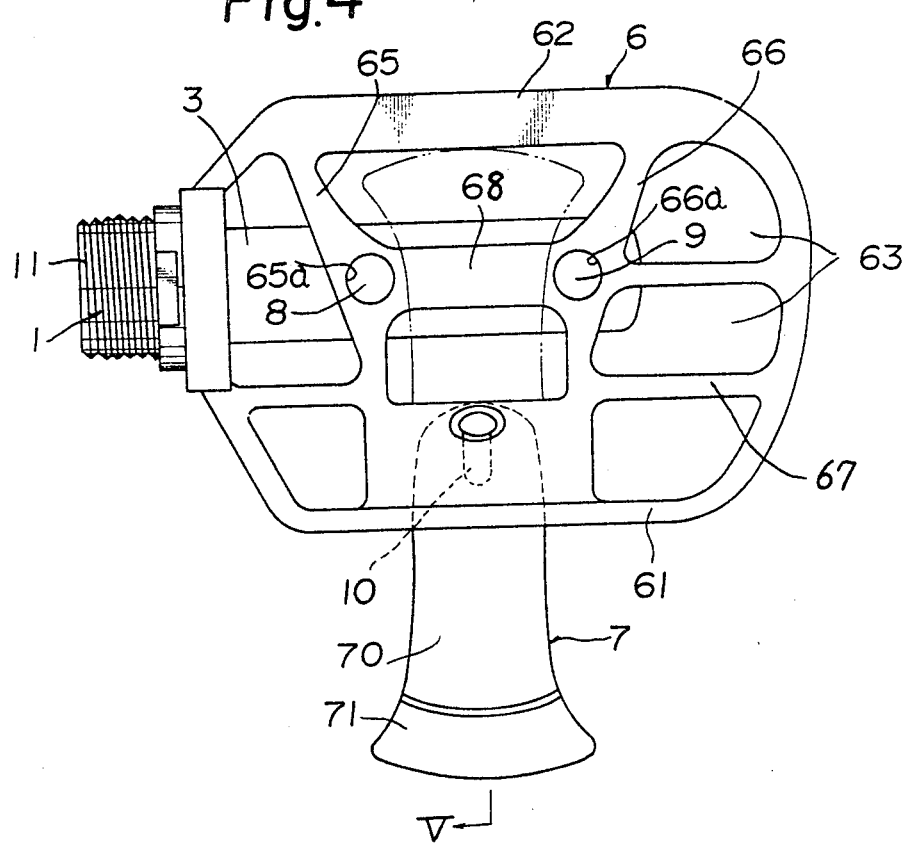

United States Patent [19]

Takeda

[11] 4,381,683
[45] May 3, 1983

[54] PEDAL FOR BICYCLE

[75] Inventor: Nobumi Takeda, Sakai, Japan

[73] Assignee: Shimano Industrial Company Limited, Osaka, Japan

[21] Appl. No.: 258,441

[22] Filed: Apr. 28, 1981

Related U.S. Application Data

[62] Division of Ser. No. 90,624, Nov. 2, 1979, Pat. No. 4,302,987.

[30] Foreign Application Priority Data

Nov. 11, 1978 [JP] Japan .................................. 53-155525

[51] Int. Cl.³ .............................................. G05G 1/14
[52] U.S. Cl. ............................................... 74/594.6
[58] Field of Search .......................... 74/594.6, 594.7

[56] References Cited

U.S. PATENT DOCUMENTS 643,896  2/1900  Goldsmith ..................... 74/594.6

FOREIGN PATENT DOCUMENTS 2450  10/1900  Austria .............................. 74/594.6
6080  of 1895  United Kingdom ............... 74/594.6
12382  of 1897  United Kingdom ............... 74/594.6

Primary Examiner—Kenneth Dorner
Attorney, Agent, or Firm—Stevens, Davis, Miller & Mosher

[57] ABSTRACT

A pedal for bicycle adapted to support a toe clip, having a shoe placing portion thereon, near the front treadle face of a pedal body. The pedal body is provided, on its top face, with a front treadle face and a rear treadle face. An engaging and disengaging means is provided on this toe clip to allow the shoe placing portion to enter and leave the front treadle face of the pedal body.

1 Claim, 5 Drawing Figures

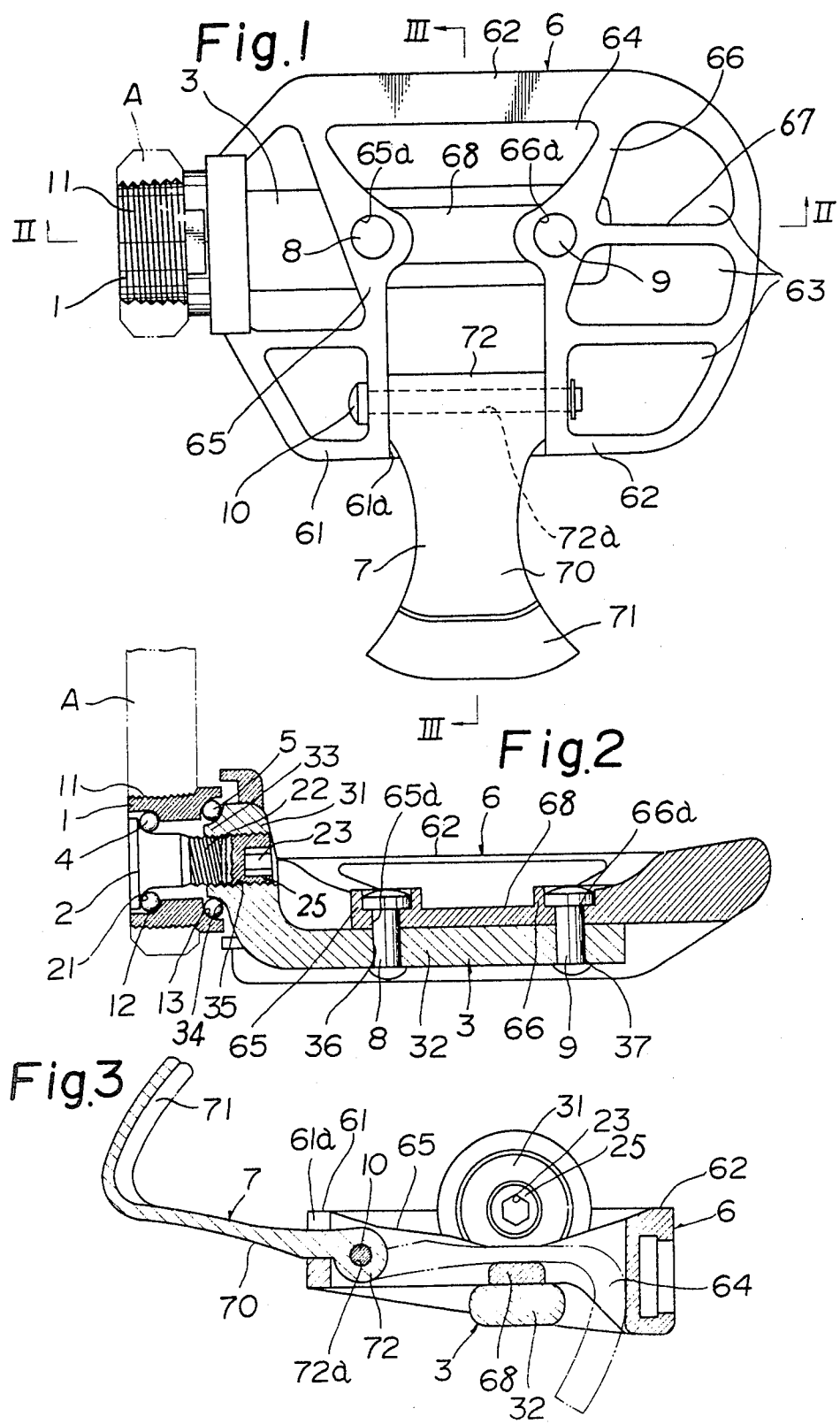

PEDAL FOR BICYCLE

This is a division of application Ser. No. 90,624 filed Nov. 2, 1979, now U.S. Pat. No. 4,302,987.

The present invention relates to a pedal for bicycle and more particularly to a bicycle pedal provided with a toe clip.

Conventionally a bicycle had a toe clip, with a shoe placing portion thereon, mounted on the pedal body. A cyclist's shoe tip which was placed on the pedal body was engaged into the shoe placing portion of the toe clip to transmit the treading force to the pedal body through both the pedal treading action and pulling-up action thereby efficiently rotating the crank.

When the toe clip was mounted on the pedal body, no problems occurred with the skilled cyclist. However, the toe clip was an obstacle with unskilled cyclists, thus interfering with the cycling operation. No clip was better under some circumstances depending upon the type of the shoes or cycling condition, in which the existence of the clip sometimes became an obstacle.

The present invention is provided to remove the above-described problems with the toe clip equipped pedal. An object of the present invention is to provide a pedal for a bicycle wherein the toe clip can be drawn out of the treadle face of the pedal body without removing the toe clip when the toe clip is not required and the pedal can be used as an ordinary pedal.

Namely, according to the present invention, the toe clip, with a shoe placing portion thereon, is supported near the front treadle face of the pedal body which is provided, on its top face, with a front treadle face and a rear treadle face. An engaging and disengaging means is provided on this toe clip to allow the shoe placing portion to enter and leave the front treadle face of the pedal body.

The engaging and disengaging means is adapted to allow the shoe placing portion of the toe clip to be drawn from the treadle face of the pedal body. The engaging and disengaging means may be provided on the shoe placing portion of the toe clip and may be preferably located on the mounting portion of the toe clip with the pedal body.

When the engaging and disengaging means is provided on the shoe placing portion, the shoe placing portion is provided separately from the horizontal portion, with a mounting portion thereon, and is supported by a pivotal shaft. When the shoe placing portion is not used, the toe clip is superposed on the top face or the bottom face of the horizontal portion and is folded to draw the shoe placing portion from the treadle face. Also, when the engaging and disengaging means is provided on the mounting portion, the toe clip is pivotally supported on the pedal body and the entire toe clip may oscillate with respect to the pedal body.

When the toe clip is not required, the shoe placing piece can be drawn from the treadle face of the pedal body to use as an ordinary pedal without the toe clip.

Figure 5:
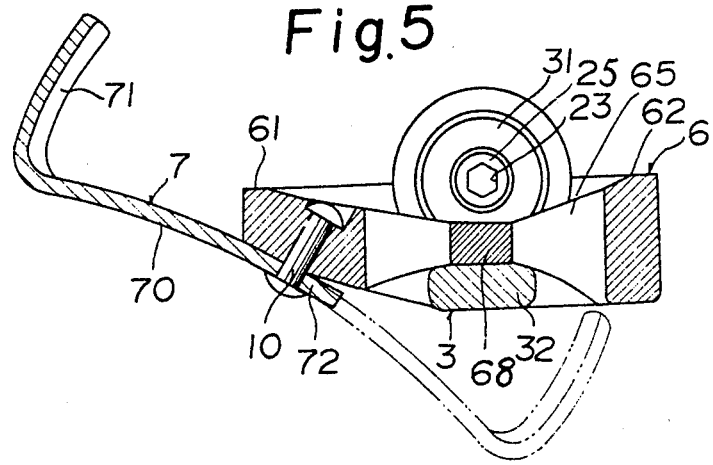

The aforesaid objects of the present invention and others will be apparent from the following description and also characteristics of the present invention will be fully understood with the aid of the accompanying drawings, in which FIG. 1 is a plan showing one embodiment of a pedal in accordance with the present invention, FIG. 2 is a cross-sectional view taken along a line ll—ll of FIG. 1, FIG. 3 is a cross-sectional view taken along a line 111—111 of FIG. 1, FIG. 4 and FIG. 5 show another embodiment, FIG. 4 is a plan of a pedal, and FIG. 5 is a cross-sectional view of a pedal taken along a line V—V of FIG. 4.

Referring to FIG. 1, numeral 1 is a bearing cylinder connected to the crank arm A of a bicycle. Numeral 2 is a pedal shaft rotatably supported on the bearing cylinder 1. The bearing cylinder comprises a cylinder which is slightly longer than the thickness of the crank arm A. The bearing cylinder is provided, on its outer periphery, with a screw 11 which is engaged into a tapped hole of the crank arm A and on its inner periphery, with a pair of ball races 12 and 13 on its axial ends.

Also, the pedal shaft 2, which is slightly longer than the bearing cylinder 1, is provided, on the outer periphery of its axial one end, with a ball race 21 and on the outer periphery of its axial other-end, with a screw 22. The pedal shaft is provided, in the central portion of its axial one-end, with a square hole (not shown) for rotating operation. Also, numeral 25 is a lock nut with a square hole 23 therein. Numeral 3 is a frame secured to the pedal shaft 2, the frame having a vertical portion 31 and a horizontal portion 32 and as shown in FIG. 2 is approximately L-shaped and made of a rigid material such as steel or the like. The vertical portion 31 is provided with a projection 33, which extends axially to the pedal shaft 2, the projection being provided, on its outer periphery, with ball race 34. A tapped hole 35 is provided at the central portion. The screw 22 of the pedal shaft 2 is engaged into the tapped hole 35 to secure the frame 3 to the pedal shaft 2.

Also, the horizontal portion 32 deviates with respect to the shaft core of the pedal shaft 2. The tip end of the horizontal portion extends in the same direction as the shaft core of the pedal shaft 2. Also, the horizontal portion 32 is rectangular in section, as shown in FIG. 3, is horizontal on its long side and has in its middle portion two first through-holes which are vertically extended.

As shown in FIG. 2, the screw 22 of the pedal shaft 2 is engaged into the tapped hole 35 of the frame 3 to fix the pedal shaft 2 with the frame 3. Balls 4 and 5 are provided, respectively, between the ball race 12 of the bearing cylinder 1 and the ball race 21 of the pedal shaft 2, and between the ball race 13 of the bearing cylinder 1 and the ball race 34 of the frame 3 to rotatably support the pedal shaft 2 and the frame 3 with respect to the bearing cylinder 1. By a screwing adjustment of the pedal shaft 2 to the frame 3, the desired rotating condition can be easily made.

Also, numeral 6 is a pedal body secured to the frame 3 of the above-described characters. The pedal body is mainly made of inexpensive and light synthetic resin or aluminum alloy. The pedal body is provided, in the front and in the rear, with a front treadle face 61 and a rear treadle face 62. The front treadle face 61 and the rear treadle face 62 are connected with each other in the right and left side portions. The intermediate portion has a plurality of through-holes 63 provided for lighter weight and a through-hole 64 for accommodating a shoe placing portion of a toe clip 7 to be described later. Two stationary pieces 65, 66, a plurality of reinforcing pieces 67 and one connecting piece 68 for connecting the stationary pieces 65, 66 are provided between the through-holes 63 and 64.

The stationary pieces 65 and 66 are provided between the front treadle face 61 and the rear treadle face 62. As shown in FIG. 3, the middle portion is concaved with respect to the ends. The stationary pieces 65, 66 have, respectively, second through-holes 65a, 66a, which respectively conform to the first through-holes 36, 37 of the frame 3. Stationary pins 8 and 9 are inserted, respectively, through the first through-holes 36, 37 and the second through-holes 65a, 66a connecting them so that the pedal body 6 is secured to the frame 3 through the stationary pieces 65 and 66. Also, the top face of the connecting piece 68 is generally lower than the stationary pieces 65 and 66. The top face of the connecting piece 68 is adapted to support a toe clip 7 to be described later.

As shown in FIG. 3, the toe clip 7 comprises a horizontal portion 70; a mounting portion 72, with a shaft hole 72a therein, located behind the horizontal portion 70; and a shoe placing portion 71 located before the horizontal portion 70 and adapted to rise upwardly. A pivotal shaft 10 in the same direction as that of the pedal shaft 2 is supported, by the toe clip, on the inner side of the front treadle face 61, i.e., between the stationary pieces 65 and 66 on the bottom side. The toe clip is pivotally provided on the pivotal shaft 10.

However, the toe clip 7 pivoted as described hereinabove becomes rotatable around the pivotal shaft 10. When the toe clip has been rotated forwardly as shown in FIG. 1 and FIG. 3, the toe clip is supported, by the front treadle face 61 forwardly projected. The shoe placing portion 71 is adapted to upwardly project with respect to the treadle faces 61 and 62. Also, when the treadle face has been rotated rearwardly, the above placing portion 71 is downwardly directed, as shown in the two-point chain line of FIG. 3, to project into the through-hole 64 of the pedal body 6. The shoe placing portion is adapted to draw from the treadle faces 61 and 62. At this time, the horizontal portion 70 is supported by the connecting piece 68.

In the above-described embodiment, the pivotal construction of the toe clip 7 by the pivotal shaft 10 consitutes an engaging and disengaging means of the present invention.

Also, in the above-described construction, a concave portion 61a is provided in the front treadle face 61 to receive the horizontal portion 70 of the toe clip 7 to stabilize the projected portion of the toe clip 7. Also, the shoe placing portion 71 of the toe clip 7 is curved, as shown in FIG. 3, to upwardly rise into the through-hole 64 for withdrawing movement, and the curved portion is brought into contact against the inner wall of the through-hole 64, whereby the withdrawing position (accommodating position) can be retained. Also, in the above-described embodiment, the pivotal shaft 10 is supported in the same direction as that of the pedal shaft 2 to support the toe clip 7. As shown in FIG. 4 and FIG. 5, the pivotal shaft 10 may be vertically positioned and be inclined rearwardly, in its top end, with respect to the lower end thereby to be supported by the pedal body 6. The toe clip 7 may be supported, by the pivotal shaft, on the under side of the pedal body 6.

In this case, the toe clip 7 pivotally turns externally of the pedal body 6, in the shoe placing portion 71, around the pivotal shaft 10 as shown in the two-point chain line of FIG. 4. The shoe placing portion 71 is located downwardly of the rear position of the pedal body 6 and adapted to be withdrawn from the treadle faces 61 and 62 downwardly through the rearward turning operation.

To cycle a bicycle with the use of the toe clip 7 when the above-described pedal is used, the toe clip 7 is pivoted, around the pivotal shaft 10, onto the forward side of the pedal body 6 as shown in FIG. 3. The shoe placing portion 71 is positioned above the treadle faces 61, 62 and the front portion of the shoe placed on the treadle faces 61 and 62 is engaged into the shoe placing portion 71.

Also, when the toe clip 7 is not required, the toe clip 7 is rearwardly pivoted around the pivotal shaft 10 as shown in the two-point chain line of FIG. 3. The shoe placing portion 71 downwardly withdraws from the treadle faces 61 and 62. In this case, the toe clip 7 cannot become an obstacle and can be used in the same manner as a pedal with no toe clip 7 therein.

According to yet another embodiment of the present invention, the shoe placing portion 71 is formed separately from the horizontal portion 70 of the toe clip 7 and is rotatably foldable with respect to the horizontal portion 70, and the entire toe clip 7 is not pivoted as described hereinabove. The shoe placing portion 71 may be upwardly pivoted when the toe clip 7 is used, and the shoe placing portion 71 may be folded when the toe clip 7 is not used.

In the pedal of the present invention as described hereinabove, the shoe placing portion of the toe clip is adapted to freely enter and leave the treadle face of the pedal body. Thus, the shoe placing portion is moved above the treadle face during the use of the toe clip to easily use the pedal. When the user is not accustomed to the toe clip, the shoe does not fit the shoe placing portion or the shoe placing portion is not required due to the cycling condition, the shoe placing portion is withdrawn downwardly of the treadle face, with the result that the cycling can be performed with the ordinary pedal without interference from the shoe placing portion.

As many apparently widely different embodiments of the present invention may be made without departing from the spirit and scope thereof, it is to be understood that the invention is not limited to any specific embodiment thereof except as defined in the appended claims.

What is claimed is:

1. A pedal for a bicycle comprising a pedal shaft, a pedal body supported on said pedal shaft, and a toe clip pivotally supported on the pedal body through a pivotal shaft means projecting from an underside of the pedal body, said pivotal shaft means extending in an inclined vertical direction such that a top end thereof is inclined rearwardly from a front of said pedal body with respect to a lower end thereof, the latter of which is positioned at said front of said pedal body, the pedal body being provided on its top face with a front treadle face and a rear treadle face and supporting through said pivotal shaft means the toe clip near the front treadle face, the toe clip being provided in its front portion with an upwardly rising shoe placing portion, said pivotal shaft means allowing the shoe placing portion to pivot to a first position where it is above the front and rear treadle faces of the pedal body and to a second position where it is below the front and rear treadle faces of said pedal body.

* * * * *